(12) United States Patent
Bäurle et al.

(10) Patent No.: US 8,630,103 B2
(45) Date of Patent: Jan. 14, 2014

(54) METHOD AND APPARATUS FOR PROGRAMMING A POWER CONVERTER CONTROLLER WITH AN EXTERNAL PROGRAMMING TERMINAL HAVING MULTIPLE FUNCTIONS

(75) Inventors: Stefan Bäurle, San Jose, CA (US); Guangchao Darson Zhang, San Jose, CA (US); Mingming Mao, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 393 days.

(21) Appl. No.: 13/161,092

(22) Filed: Jun. 15, 2011

(65) Prior Publication Data

US 2012/0320640 A1 Dec. 20, 2012

(51) Int. Cl.
*H02M 3/335* (2006.01)

(52) U.S. Cl.
USPC .................. 363/21.17; 363/49; 363/56.03

(58) Field of Classification Search
USPC .......... 363/21.12, 21.13, 21.14, 21.15, 21.16, 363/21.17, 21.18, 49, 56.03, 56.04, 56.05
See application file for complete search history.

(56) References Cited

U.S. PATENT DOCUMENTS

| | | | | |
|---|---|---|---|---|
| 7,697,308 B2* | 4/2010 | Huynh et al. | ............... | 363/21.16 |
| 7,911,814 B2* | 3/2011 | Tao et al. | .................... | 363/21.12 |
| 8,125,798 B2* | 2/2012 | Huynh et al. | ............... | 363/21.12 |
| 8,416,596 B2* | 4/2013 | Huang | ............................ | 363/97 |
| 2008/0304295 A1* | 12/2008 | Chou | ......................... | 363/21.18 |
| 2011/0096574 A1* | 4/2011 | Huang | ....................... | 363/21.18 |

\* cited by examiner

*Primary Examiner* — Adolf Berhane
*Assistant Examiner* — Lakaisha Jackson
(74) *Attorney, Agent, or Firm* — Blakely Sokoloff Taylor & Zafman LLP (57) ABSTRACT

A power converter controller is disclosed. An example controller includes a control circuit coupled to receive a feedback signal representative of an output of the power converter. The control circuit coupled to control a switching of a power switch of the power converter in response to the feedback signal to control a transfer of energy from an input of the power converter to the output of the power converter. An internal programming interface circuit is coupled to the control circuit. A coupling switcher is coupled to the internal programming interface circuit. An external programming terminal is selectively coupled to the internal programming interface circuit through the coupling switcher. An external programming circuit coupled to the external programming terminal is coupled to the internal programming interface circuit through the coupling switcher during a startup programming condition and during a fault condition of the power converter. The external programming circuit that is coupled to the external programming terminal is decoupled from the internal programming interface circuit by the coupling switcher during a normal operating condition of the power converter.

31 Claims, 7 Drawing Sheets

METHOD AND APPARATUS FOR PROGRAMMING A POWER CONVERTER CONTROLLER WITH AN EXTERNAL PROGRAMMING TERMINAL HAVING MULTIPLE FUNCTIONS

BACKGROUND INFORMATION

1. Field of the Disclosure

The present invention relates generally to power converters, and in particular but not exclusively, relates to controllers for switched mode power converters.

2. Background

A wide variety of household or industrial appliances require a regulated direct current (dc) source for their operation. Switch mode power converters are to convert a low frequency (e.g. 50 Hz or 60 Hz) high voltage ac (alternating current) input voltage to the required level of dc (direct current) output voltage. Various types of switch mode power converters are popular for this use because of their well regulated output, high efficiency, small size along with the safety and protection features. Different control methods such as PWM (pulse width modulation), PFM (pulse frequency modulation) or on-off control may be used in controllers for switch mode power converters to regulate the output voltage versus load and line variations.

Switch mode power converters may include a high frequency transformer to provide safety isolation and to transform the voltage level, usually to a lower voltage. The output of the transformer is then rectified and filtered to provide a regulated dc output to be applied to the electronic device. Output regulation in a switched mode power converter is usually provided by sensing the output and controlling the power converter in a closed loop. The output sense could be realized with an extra winding on the transformer core such as a bias, auxiliary or feedback winding, which in some cases may also provide the operating power for the power converter controller. In some switched mode power converters, the feedback or control signal can be provided with an optocoupler from a sense circuit coupled to the DC output. In some other switched mode power converters, the feedback or control signal could be extracted indirectly from a third winding that is magnetically coupled to the secondary winding on the same transformer core. The feedback or control signal may be used to modulate a duty cycle of a switching waveform generated by the power converter controller or may be used to change switching frequency or by disabling some of the cycles of the switching waveform generated by the power converter controller to control the DC output.

In order to provide specific functions to a power converter controller, additional pins or electrical terminals are added for each function to an integrated circuit of the power converter controller. As a consequence, each additional function that is added to a power converter controller generally translates into an additional pin on the power converter controller chip, which translates into increased costs and additional external components. Another consequence of providing additional functionality to power converter controllers is that sometimes there is a substantial increase in power consumption by providing the additional functionality.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for programming a power converter controller with an external programming terminal having multiple functions are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, a power converter controller with a single external programming terminal having multiple functions is introduced. In one example, a user is allowed to program two or more different characteristics of the power converter controller using the same single external programming terminal. Furthermore, in one example, external programming circuitry that is coupled to the external programming terminal is decoupled from the power converter controller during normal operation of the power converter such that substantially no power is consumed through the external programming terminal during normal operation. In addition to the power consumption savings during normal operation, there is also a savings in space and size by reutilizing and sharing common circuit components for the two or more programmable functions of the power converter controller in accordance with the teachings of the present invention.

Figure 1:
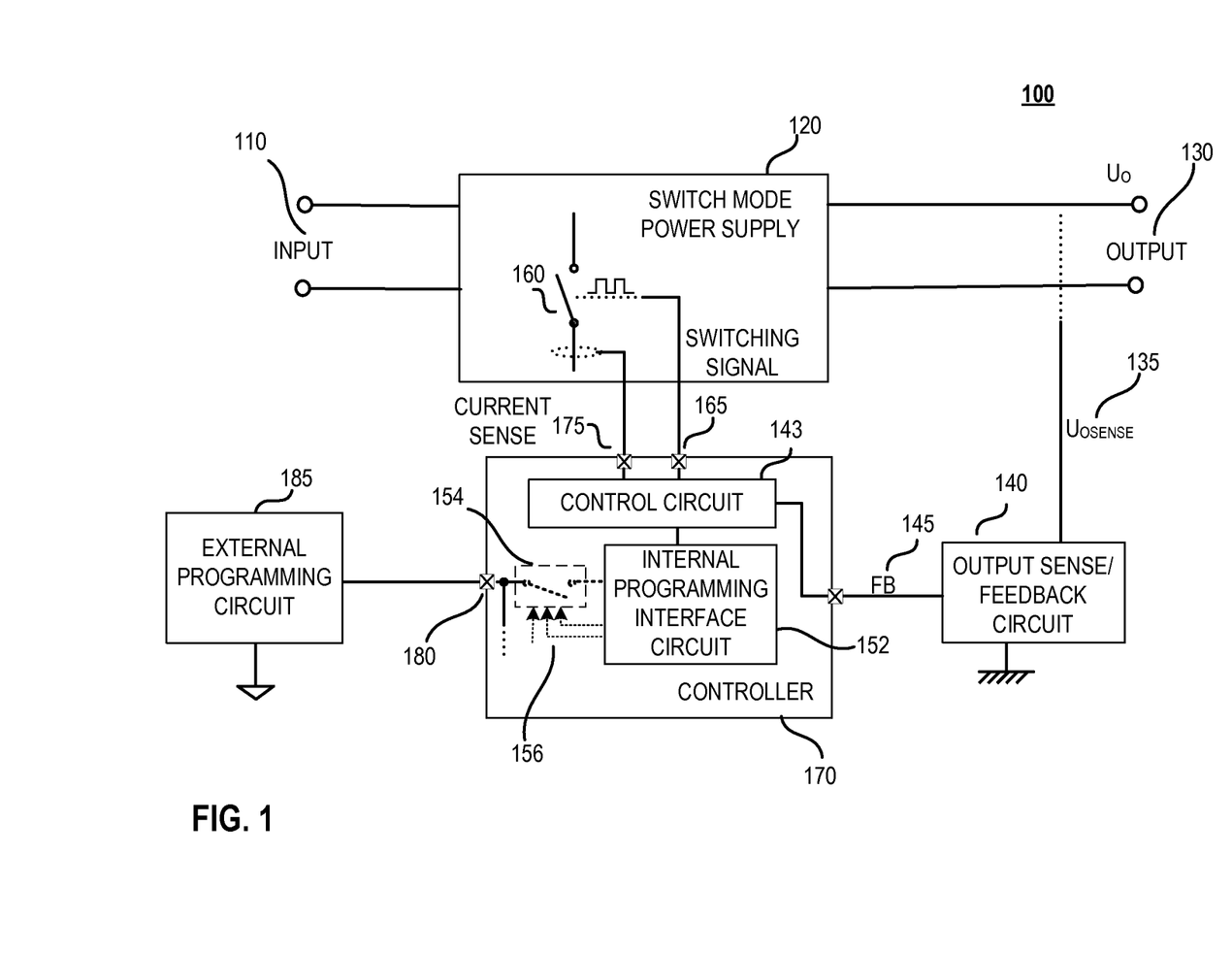
FIG. 1 is a block diagram illustrating generally one example of a switch mode power converter including a controller with an external pin used for programming multiple functions in accordance with the teachings of the present invention.

To illustration, FIG. 1 shows a block diagram 100 illustrating generally one example of a power converter 120 including a controller 170 with an external programming terminal 180 used for programming multiple functions in accordance with the teachings of the present invention. As shown in the depicted example, power converter 120 is a switch mode power converter and therefore includes a switch 160 that is switched in response to a switching signal 165 to control a transfer of energy from an input 110 of power converter 120 to an output 130 of power converter 120. In the example, controller 170 includes a control circuit 143 that is coupled to generate switching signal 165 in response to a feedback signal 145, which is representative of output 130 of power converter 120. In one example, an output sense/feedback circuit 140 is coupled to sense an output signal $U_{OSENSE}$ 135 from output 130 to generate feedback signal 145. In one example, control circuit 143 is also coupled to receive a current sense signal 175, which is representative of a current through switch 160. In one example, current sense 175 may be utilized by control circuit 143 to provide a current limit function for switch 160 when generating switching signal 165 in accordance with the teachings of the present invention.

As shown in the example depicted in FIG. 1, controller 170 also includes an internal programming interface circuit 152 that is coupled to the control circuit 143 and a coupling switcher 154 coupled to the internal programming interface circuit 152. In addition, controller 170 also includes an external programming terminal that is selectively coupled to the internal programming interface circuit 152 through the coupling switcher 154. As shown in the example, an external programming circuit 185 is coupled to the external programming terminal 180. As will be discussed, the external programming circuit 185 is coupled to the internal programming interface circuit 152 through the coupling switcher 154 in response to activation signals 156 during for example a startup programming condition and for example during a fault condition of the power converter 120. In the example, the external programming circuit 185 is decoupled from the internal programming interface circuit 152 by the coupling switcher 154 in response to activation signals 156 during a normal operating condition of the power converter such that substantially no power is consumed through the external programming terminal 180 during normal operation of power converter 120 in accordance with the teachings of the present invention.

Figure 2:
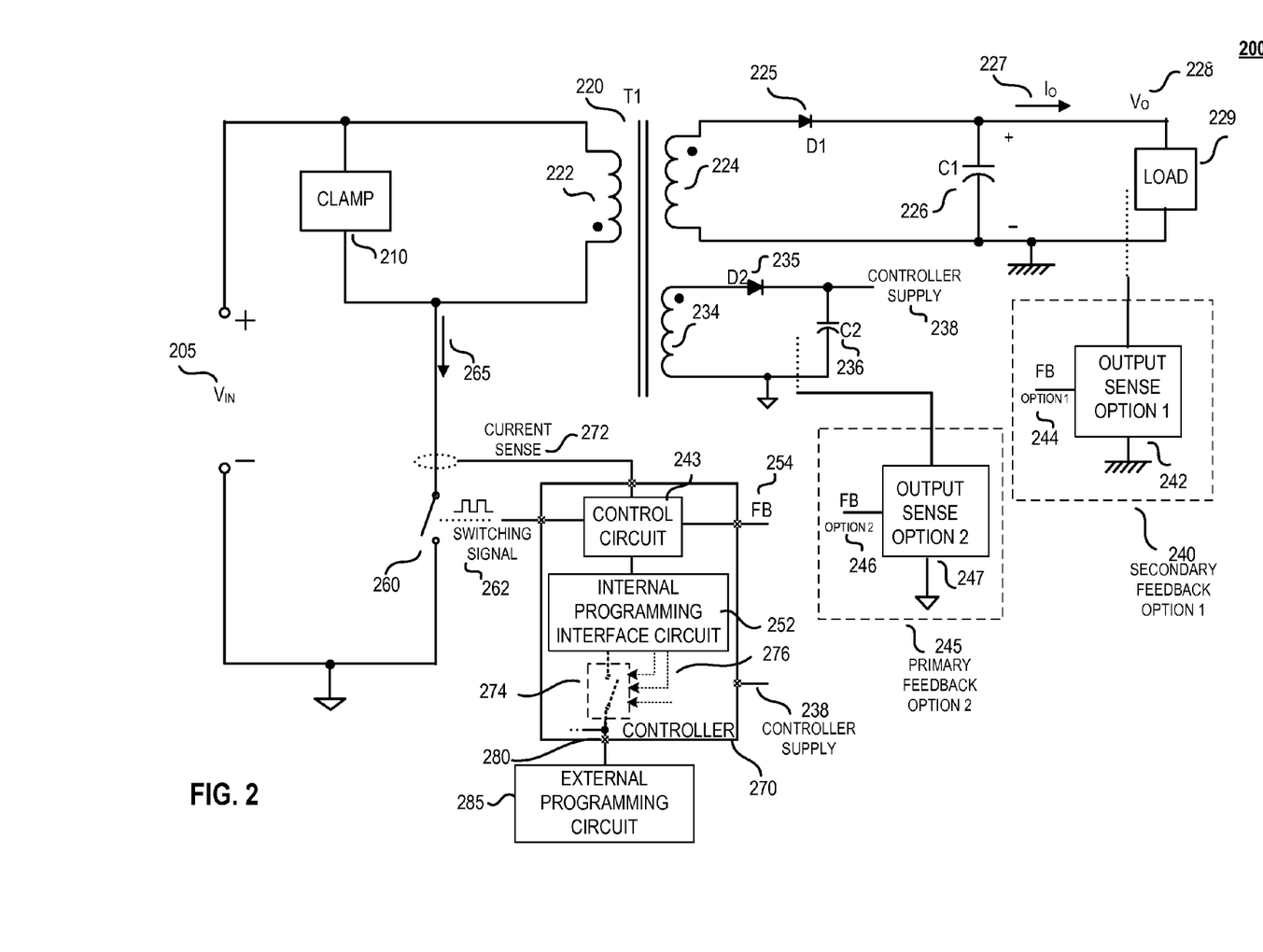
FIG. 2 is a schematic illustrating generally one example of a flyback converter power converter including a controller having an external programming terminal used for programming multiple functions in accordance with the teachings of the present invention.

FIG. 2 is a schematic illustrating generally one example of a flyback converter power converter 200 including a controller 270 having an external programming pin used for programming multiple functions in accordance with the teachings of the present invention. As shown in the depicted example, power converter 200 includes an energy transfer element 220. In the illustrated example, energy transfer element 220 is a transformer that includes a first winding 222, a second winding 224 and a third winding 234. First winding 222 is coupled to input Vin 205 and switch 260. A clamp circuit 210 is coupled across first winding 222. Second winding 224 is coupled to a rectifier D1 225 and a filter capacitor C1 226 that is coupled across a load 229, which is coupled to receive output voltage Vo 228 and output current Io 227. Third winding 234 is coupled to rectifier 235 and a filter capacitor C2 236 that is coupled to provide a controller supply 238.

As shown in the illustrated example, switch 260 is switched ON and OFF in response to switching signal 262 to control a transfer of energy from input Vin 205 to the output of the power converter to load 229. Due to the direction of transformer windings (illustrated by the dot sign on each winding), the first winding 222 stores the energy when switch 260 is switched to the ON state, and releases the energy to the second winding 224 when switch 260 is switched to the OFF state. Clamp circuit 210 limits the switching high amplitude oscillations across first winding at turn off. In the case of dc output as shown, the rectifier D1 225 and filter capacitance C1 226 provide a regulated dc output Vo 228 across the load 229.

In the example depicted in FIG. 2, several feedback options are illustrated. For example, feedback can be provided to regulate the power converter output across load 229 with either a secondary feedback option 240, where the feedback signal 244 is referenced to the secondary reference level (ground) through the output sense option 1 (242); or by the primary feedback option 245, where feedback signal 246 is referenced to the primary reference level (ground) through the output sense option 2 (247). In the illustrated example, controller 270 is shown as receiving corresponding feedback signal 254, which can be received from either secondary feedback option 240 or primary feedback option 245.

As shown in FIG. 2, controller 270 receives input signals including feedback FB 254 and current sense 272, and generates an output of the switching signal 262 to control the switching of switch 260 and control the transfer of energy from input Vin 205 through energy transfer element 220 to regulate output voltage Vo 228. In the depicted example, controller 270 receives power during normal operation through controller supply 238, which is provided by third winding 234 of transformer 220 through rectifier D2 235 and filter capacitance C2 236.

In the example depicted in FIG. 2, controller 270 is also illustrated as including a control circuit 243, which is coupled to an internal programming interface circuit 252. As shown in the example, an external programming circuit 285 is coupled to an external programming terminal 280 of the controller 270. In the example, external programming terminal 280 is selectively coupled to internal programming through a coupling switcher 274 in response to activation signals 276. In operation, coupling switcher 274 decouples external programming terminal 280 from internal programming interface circuit 252 during normal operation such that external programming circuit 285 is correspondingly decoupled, or floats, during the normal operation with substantially no power consumption through external programming terminal 280. In one example, during initialization programming at startup, or during the open loop fault detection and in auto-restart mode, external programming terminal 280 is coupled to the internal programming interface circuit 252 through coupling switcher 274 in response to activation signals 276.

Figure 3:
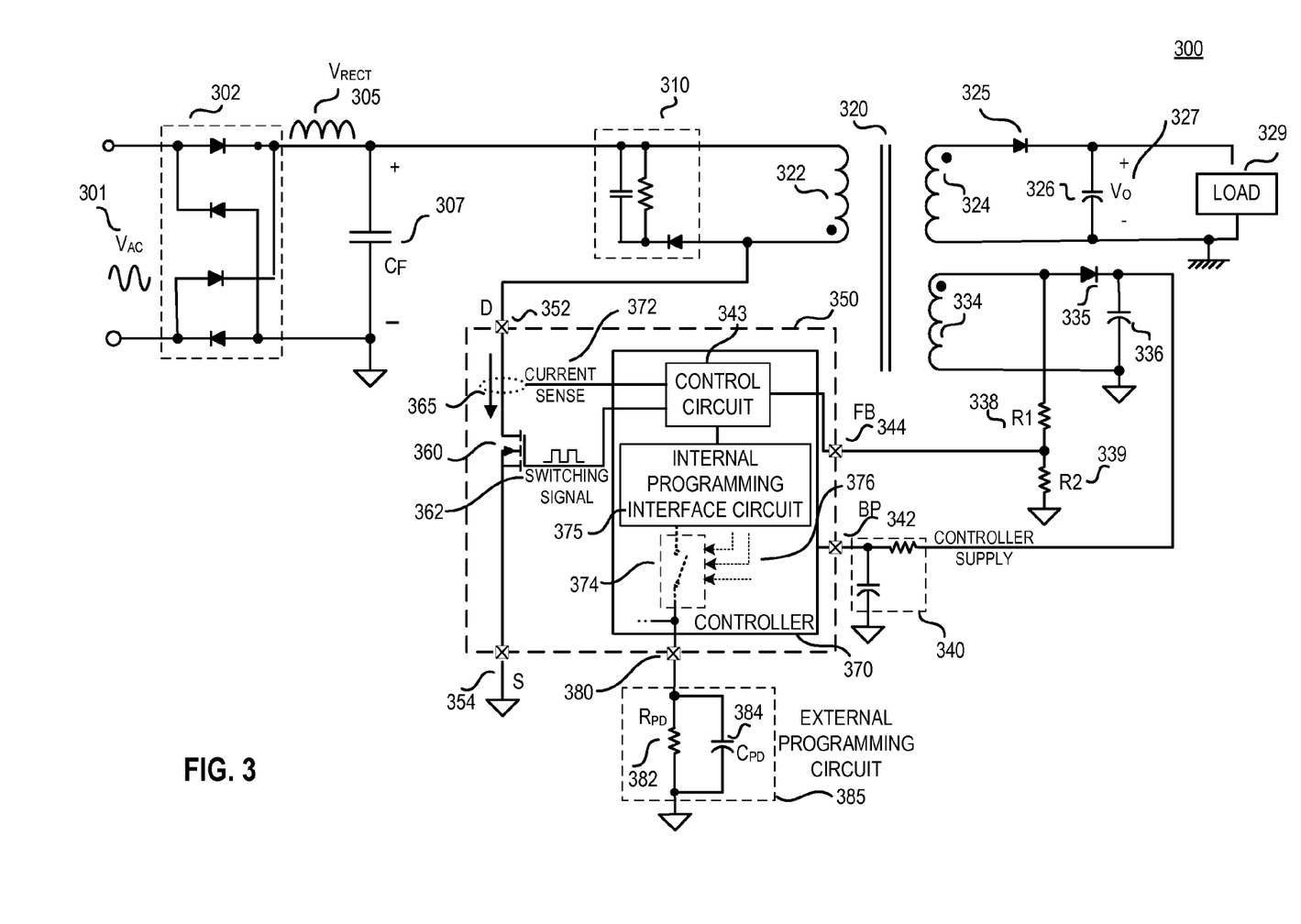
FIG. 3 is a schematic illustrating generally another example of a flyback converter power converter including a controller having an external programming terminal used for programming multiple functions in accordance with the teachings of the present invention.

FIG. 3 is a schematic illustrating generally another example of a flyback converter power converter 300 including a controller 370 having an external programming terminal 380 used for programming multiple functions in accordance with the teachings of the present invention. In the depicted example, controller 370 includes external programming terminal 380 integrated with the power switch 360 in a single monolithic or hybrid integrated circuit 350. As shown, power converter 300 includes an energy transfer element 320, which in the example is illustrated as a transformer that includes a first winding 322, a second winding 324 and a third winding 334. First winding 322 is coupled to a drain terminal D 352 of a switch 360. A clamp circuit 310, which in the example is an RCD clamp, is coupled across first winding 322. First winding 322 is coupled to receive a rectified voltage $V_{RECT}$ 305 from a filter capacitor $C_F$ 307, which is coupled through a front end full bridge rectifier 302 to input line ac voltage $V_{AC}$ 301. Second winding 324 is coupled to a rectifier D1 325 and a filter capacitor 326 to provide an output voltage Vo 327 to a load 329. The third winding 334 is referred to the primary ground (reference potential level) and could also provide a dc supply to the supply pin BP 342 through the diode 335, bulk capacitance 336 and the optional RC filter 340. The voltage induced on the third winding 334, the ac or dc rectified (on example of FIG. 3 the ac side is utilized) provides a feedback signal through the resistive divider consisting of R1, 338 and R2, 339 to the feedback pin 344 referred to the primary ground. In the illustrated example, controller 370 receives the input signals FB 344, from the third winding 365, and current sense signal 372, which is representative of switch current 365, to generate the switching signal 362 to regulate the output, in the example shown by utilizing the peak current PWM control mode. In one example, the switching frequency for switch 360 and the current limit for switch current 365 are defined based on the load level and feedback signal.

As shown in the depicted example, controller 370 includes external programming terminal 380, which is coupled to the internal programming interface circuit 375 through the coupling switcher 374 in response to activation signal 376. In one example, the activation signal 376 is activated during startup and/or during a fault condition, such as for example an open loop fault condition. Thus, a feature of external programming terminal 380 is that the external programming terminal is only coupled to internal programming interface circuit 375 at startup to perform programming of the selective characteristics of the controller, such as for example programming the current limit and switching frequency. As well, coupling switcher 374 is activated during the preventive or protective events requiring some user programmed delay period, such as for example an open loop fault event, which in one example can be detected by at least 10% drop of feedback FB signal from its regulated value over a given amount of time. As a result, an extended shutdown delay is applied to each cycle of the auto-restart intervals. In other words, an extended on time is applied to the cycles of auto-restart.

In the illustrated example, the external programming interface circuit 385 coupled to the external programming terminal 380 has an RC time constant and includes a resistance $R_{PD}$ 382 and an optional capacitance $C_{PD}$ 385. In another example, capacitance $C_{PD}$ 385 is not included, but external programming interface circuit 385 has a parasitic capacitance that provides a capacitance for the RC time constant of external programming interface circuit 385. In either case, each interval of charging up to an upper limit threshold and the interval of discharging down to a lower limit threshold introduces a time period as multiples of $R_{PD}C_{PD}$ ($m*R_{PD}C_{PD}$) such that each cycle of charging and discharging from the lower threshold to the upper threshold and back to the lower threshold defines one unit of time delay. The total shutdown time delay can be adjusted in discrete units of $m*R_{PD}C_{PD}$ by counting number K of the charge/discharge cycles between the two thresholds.

In one example, when the capacitor $C_{PD}$ is charged via a voltage source, the accuracy effect of the multiple m is discussed in more detail in FIGS. 5A-5C below. Each interval of charging from the lower threshold to the upper threshold with a reasonable accuracy preferably can be adjusted by selecting m=2 to be approximately $2*R_{PD}C_{PD}$ and each interval of discharging from upper threshold to the lower threshold with a reasonable accuracy preferably can be adjusted as well around $2*R_{PD}C_{PD}$. For instance, in an example of $R_{PD}$=1.25 kΩ and $C_{PD}$=680 nF with an upper threshold of 1.2 V and a lower threshold of 0.25 V, if the number of charge/discharge events for the extended shutdown delay is selected K=128, a total delay of about 0.5 s is realized in accordance with the teachings of the present invention.

Figure 4A:
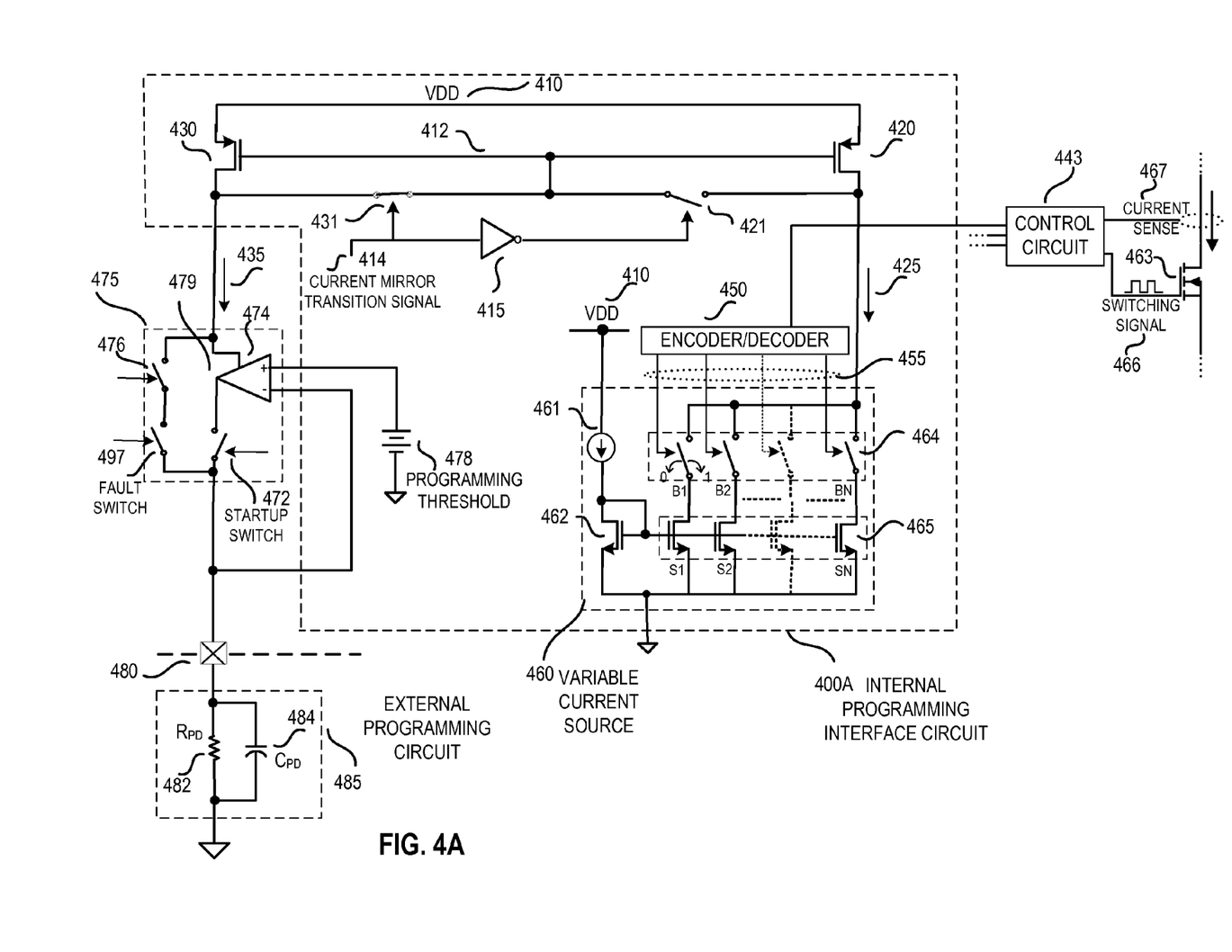
FIG. 4A is a schematic illustrating generally one example of elements included in an internal programming interface circuit of a controller and an external programming circuit during a startup condition of a power converter in accordance with teachings of the present invention.
Figure 4B:
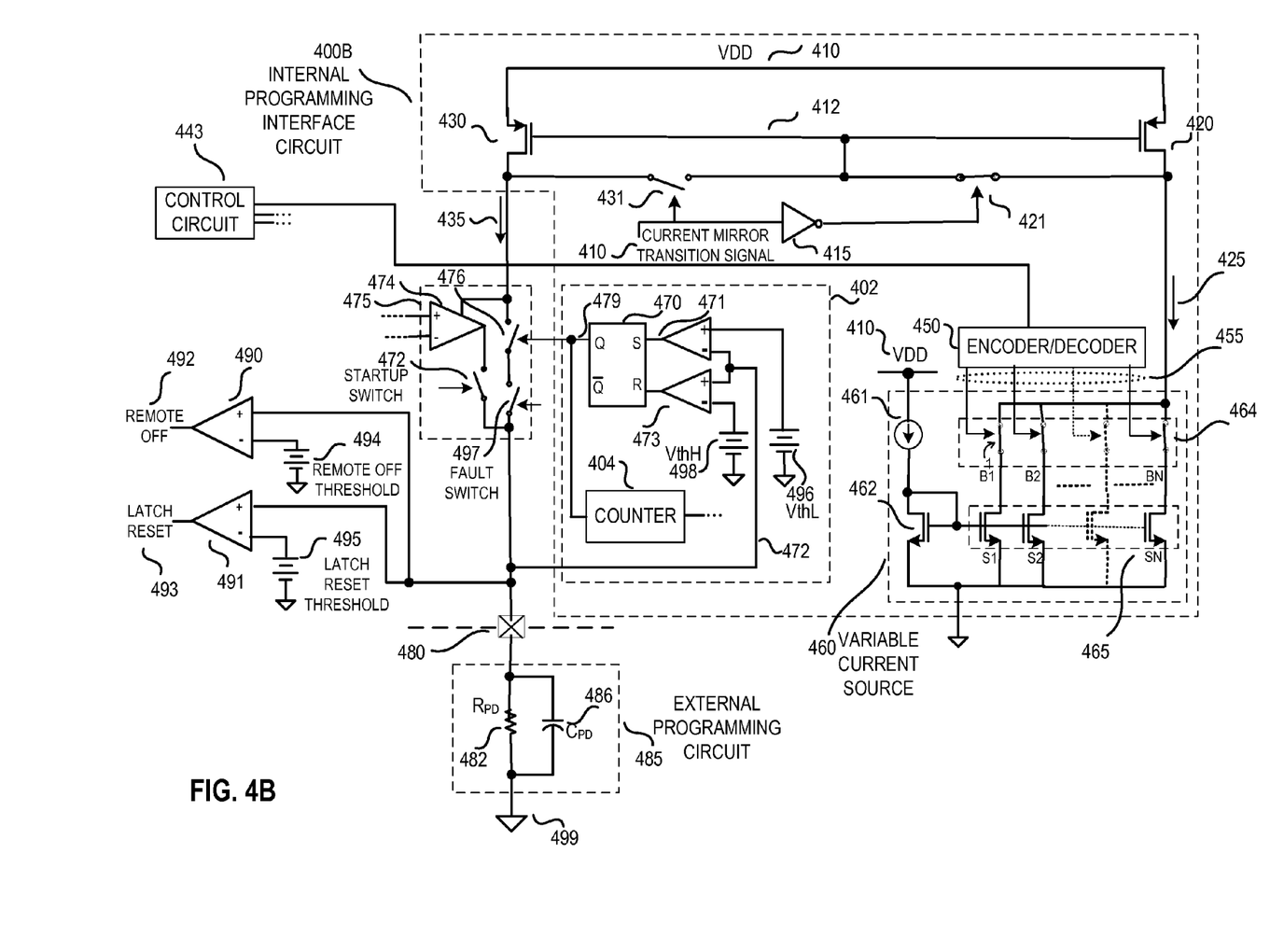
FIG. 4B is a schematic illustrating generally one example of elements included in an internal programming interface circuit of a controller and an external programming circuit during a fault condition of a power converter in accordance with teachings of the present invention.

FIG. 4A is a schematic illustrating generally one example of elements included in an internal programming interface circuit 400A of a controller and an external programming circuit 485 during a startup condition of a power converter in accordance with teachings of the present invention. FIG. 4B is a schematic illustrating generally one example of elements included in an internal programming interface circuit 400B of a controller and the external programming circuit 485 during a fault condition of the power converter in accordance with teachings of the present invention. In particular, FIG. 4A presents the inter-couplings of the internal circuit blocks during the startup programming of the controller characteristics such as current limit and switching frequency while FIG. 4B presents the inter-couplings of internal circuit blocks for the extended waiting (delay) time such as the shutdown delay functionality during a fault event such as the open loop in accordance with the teachings of the present invention. It is noted that in FIGS. 4A and 4B, most components and circuit blocks are common to be shared for multiple purposes at different non-overlapping time intervals. As such, the common components and circuit blocks are identified by similar reference numbers on FIGS. 4A and 4B. In accordance with the teachings of the present, it is appreciated that the common circuit elements that are shared and reutilized for multiple different functions results in an overall savings in space, size and costs.

Referring now to the example illustrated in FIG. 4A, internal programming interface circuit 400A is shown with simplified inter-couplings of the components utilized during initialization at startup for the programming of programmable characteristics of the controller, such as for example current limit or switching frequency in accordance with the teachings of the present invention. As shown, a resistor $R_{PD}$ 482 in the external programming circuit 485 is coupled to the external programming terminal 480. In one example, the value of resistor $R_{PD}$ 482 is selected by a user from a predefined table/matrix for different desired programmable characteristics of the controller, such as for example current limit or switching frequency. For instance, in one example, there are seven different current limit options, such as for example, 40%, 50%, 60%, 70%, 80%, 90% and 100% of the highest possible current limit, and 2 options of switching frequency such as for example 66 kHz and 132 kHz. Thus, in the example, the user defined external resistance $R_{PD}$ 482 is selectable from a total 14 options in a 7×2 table/matrix in accordance with the teachings of the present invention.

It is appreciated that in other examples, other characteristics of the controller such as for instance brown-in and brown-out thresholds, shut down type (e.g., latching or hysteretic), etc., can also be programmed through the same pin in accordance with the teachings of the present invention. In such examples that included additional programmable characteristics, the additional options are included in a larger matrix for selection in accordance with the teachings of the present invention.

In the example shown in FIG. 4A, switches 430 and 420, which in one example are PMOS switches, have the coupled gates. The alternative on/off states of switches 431 and 421 through the current mirror transition signal 414 and the inverter 415 define either switch 430 or switch 420 to be coupled as a diode connected PMOS switch that mirrors a current on the other PMOS switch. During initialization at startup, the current mirror transition signal 414 closes switch 431 and through the inverter 451 opens switch 421. As a result PMOS switch 430 is diode connected mirroring the current 435 from VDD bus 410 onto PMOS switch 420, which is shown as the current 425.

As shown in the example depicted in FIG. 4A, coupling switcher 475 includes a startup switch 472, which at startup is activated in response to an activation signal to set the programmable characteristics of the controller, such as for example current limit and switching frequency. The current 435 sourced from an internal reference supply VDD 410 to the resistance $R_{PD}$ 482 in the external programming circuit 485 coupled to external programming terminal 480 is conducted through a buffer 474. As shown, the inverting input of buffer 474 is coupled to the external programming terminal 480 and the noninverting input of buffer is coupled to a programming threshold 478. In operation, buffer 474 regulates/buffers the current 435 until the voltage at the external programming terminal 480 reaches to the programming threshold 478 and latches at this level during startup until the end of programming interval.

The current flow 435 through resistance $R_{PD}$ 482 is mirrored through the current mirror switches 420 and 430, and the current flow 425 is therefore matched through variable current source 460. In one example, variable current source 460 includes a plurality of switched current sources, which include the plurality of current sources 464 coupled to the plurality of switches 464, which are controlled in response to encoder/decoder 450 as shown. In one example, the plurality of current sources 465 may include incremental binary weighted current sources, which are selectively activated with the plurality of switches 464 in response to encoder/decoder 450.

As shown in the depicted example, variable current source 460 includes a reference current source 461 with a current that is conducted through a diode connected switch 462, which in one example is an NMOS switch. The current is mirrored through the plurality of current mirror switches of the plurality of current sources 465, which in one example includes NMOS switches S1, S2, ..., SN, as shown. In the illustrated example, the plurality of current sources 465 are coupled in parallel to receive the total current of 425 through the plurality of switches 464, which are also labeled B1, B2, ..., BN, as controlled by the signals 455 from the encoder 450. The value of current 425 that is the mirrored and equivalent to the current through the user programming impedance $R_{PD}$ 482 as indicated in encoder/decoder 450 is then used to set the programmable characteristic of the controller. In one example, encoder/decoder 450 includes an N-bit shift register or the like to select the programmable characteristic of the controller, such as current limit and oscillator frequency of the controller. In one example, the selected current limit as indicated in the N-bit shift register may then be utilized by control circuit 443 coupled to encoder/decoder 450 to control the switching of switch 463 in response to current sense 467. Similarly, in one example, the selected switching frequency as indicated in the N-bit shift register may then be utilized by control circuit 443 coupled to encoder/decoder 450 to control the switching frequency of switching signal 466 to control the switching of switch 463.

It is noted that the capacitor $C_{PD}$ 484 that can be included in an example external programming circuit 485 is an option for the user to program an extended waiting or delay time, such as the shutdown delay, and would have a negligible effect on the short interval of programming by the dc current through the resistance $R_{PD}$ 482 for the controller characteristics such as current limit and frequency programming at startup in accordance with the teachings of the present invention.

As mentioned, FIG. 4B shows an example of components involved in applying a programmable delay or waiting period such as programming the extended shutdown delay during an open loop fault detection event and the switch on-interval extension in each cycle of auto restart mode in accordance with the teachings of the present invention. In one example, the event of open loop fault detection and applying the extended shutdown delay may occur during normal operation of the power converter after startup has been completed. Accordingly, the programming at initialization/startup as discussed above with respect to FIG. 4A for setting programmable characteristics, such as current limit and switching frequency, do not occur at the same time that a fault is detected in the power converter. As a result, the block designs utilized in FIG. 4A to set the programmable characteristics of the power converter during startup can therefore be reutilized when a fault is detected, which saves on space, size and cost in accordance with the teachings of the present invention. As can be appreciated, it is noted that the internal programming interface circuit 400B illustrated in FIG. 4B shares many of the same components of the internal programming interface circuit 400A of FIG. 4A.

As mentioned previously, during normal operation, the external programming terminal 480 is decoupled from the internal programming interface circuit 400B and is floating with no current and no loss. Accordingly, substantially no power is consumed through external programming terminal 480 during normal operation. In the example illustrated in FIG. 4B, only in the event of a fault detection, such as an open loop fault detection, is the fault switch 497 activated and power is consumed through external programming terminal 480 in accordance with the teachings of the present invention.

In one example, when a fault is detected, encoder 450 activates all of the plurality of switches 464 with activation signals 455 to activate all of the plurality of current sources 462 of variable current source 460. In the example, the current source 461 provides a current from the VDD bus 410, which is conducted through the diode connected NMOS 462 and is mirrored through the plurality of current sources 462 through mirror NMOS switches S1, S2, ..., SN. Accordingly, the current 425 is conducted through PMOS switch 420.

As shown in the depicted example, the gate coupling of the switches 420 and 430 is now changed compared to the internal programming interface circuit 400A of FIG. 4A configuration by changing the state of current mirror transition signal 414 such that switch 421 is OFF and switch 431 is ON. As a result, PMOS switch 420 is now diode connected and mirrors the current 425 through PMOS switch 430, which is shown by the current 435. As will be shown with respect to FIG. 4B, current 435 is a charge current that will be activated and deactivated in accordance with the teachings of the present invention.

As shown in the illustrated example, internal programming interface circuit includes a timing circuit, which includes a set-reset latch 470. The set terminal of latch 470 is coupled to an output of comparator 471. The reset terminal of latch 470 is coupled to an output of comparator 473. The noninverting terminal of comparator 471 is coupled to a low threshold voltage VthL 496. The inverting terminal of comparator 473 is coupled to a high threshold voltage VthH 498. The inverting terminal of comparator 471 and the noninverting terminal of comparator 473 are coupled to receive a voltage 472 of the external programming terminal 480. A counter 404 is coupled to count an output signal 479 of latch 470.

In one example, because of a very low offset voltage of voltage 472 on the external programming terminal 480, the output of comparator 471 goes high and sets the input of latch 470. As shown, the output signal 479 from the output Q of the latch 470 closes switch 476 to activate current 435, which charges the external programming circuit 485. If the user optional capacitor $C_{PD}$ 486 for the programmable extended delay has been included in external programming circuit 485 in parallel with the resistor $R_{PD}$ 482, then current 435, which in one example is approximately 200 uA, starts to charge $C_{PD}$ 486 with an RC time constant $R_{PD}C_{PD}$. In operation, the current 435 continues to charge the external programming circuit 485 until the voltage 472 at external programming terminal 480 reaches the high threshold voltage VthH 498. When the voltage 472 at external programming terminal 480 reaches the high threshold voltage VthH 498, comparator 473 resets latch 470, which deactivates switch 476, which deactivates current 435 until the voltage 472 reaches the low threshold voltage VthL 496, which causes comparator 471 to set latch 470. In operation, the number of cycles of activations and deactivations of the application of current 435 to the external programming circuit are counted by counter 404.

As will be discussed in FIGS. 5A-5C below, in one example, the activations and deactivations of current 435 for the charging and discharging time period is approximately 2 $R_{PD}C_{PD}$. In one example, the time period of approximately 2 $R_{PD}C_{PD}$ provides a suitable slope of the charging and discharging voltages to enable a reasonably accurate measurement. As long as the voltage 472 on external programming terminal 480 received by the comparators 471 and 473 is less than the low threshold voltage VthL 496, the output signal of comparator 471 sets the latch 470 and its output signal Q 479 closes switch 476 to charge the $R_{PD}C_{PD}$ of the external programming circuit 485 at the external programming terminal 480. When the charged voltage 472 at external programming terminal 480 reaches the high threshold voltage VthH 498, the output signal of comparator 473 resets latch 470 to pull down output Q 479 and open the switch 476, which results in discharging of the capacitor $C_{PD}$ 486 until after a time duration of, for example, $2R_{PD}C_{PD}$ and the voltage 472 drops back down to the low threshold voltage VthL 496 to restart the charging cycle and repeat the cycles of activations and deactivations of current 435 for a predetermined number K of repetitions. In one example, the predetermined number K can be counted using counter 404 coupled to latch 479. In one example, $R_{PD}C_{PD}$=1.25 kΩ×0.68 μF, K=128, and the total extended shutdown delay is 435 ms (i.e., 2×2×128×1.25× 0.68).

In one example, additional optional features utilizing external programming terminal 480 can also be included to provide further optional control or protection features such as remote ON/OFF control or latch reset. For instance, an example of a remote off control of the power converter controller is depicted in FIG. 4B using a comparator 490, which has its noninverting input terminal coupled to receive the voltage 472 at the external programming terminal 480. In the example voltage 472 at the external programming terminal 480 can be externally applied and is compared to a remote off threshold voltage 494, which in one example is 1.25 V, coupled to the inverting input terminal of comparator 490. In one example, applying an external voltage of higher than the remote off threshold 494 to the external programming terminal 480 remotely commands the controller OFF through the output signal remote off 492 of the comparator 490 in accordance with the teachings of the present invention.

In addition, a latch reset function, which in one example may be a fast ac reset of the power converter controller, can be achieved by increasing a voltage 472 that is externally applied to the external programming terminal 480, and coupled to the noninverting input of the comparator 491. In the example, latch reset threshold voltage 495, which in one example is 3.4 V, is coupled to the inverting input of comparator 492. When an externally applied voltage 472 at the external programming terminal 480 rises above the latch reset threshold voltage 495 a latch reset output signal 493 is generated at the output of comparator 491 in accordance with the teachings of the present invention.

Figure 5A:
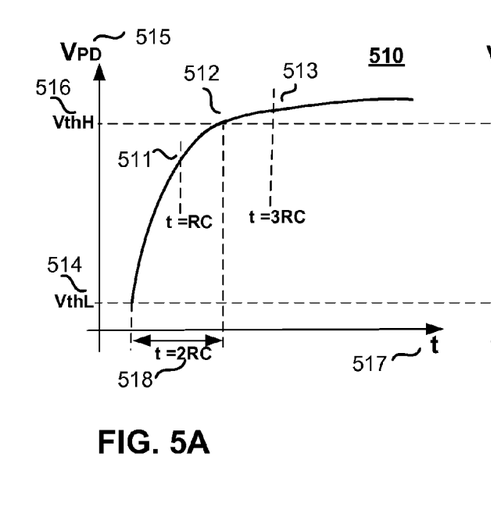
FIG. 5A shows a timing diagram that illustrates an example rise time of a voltage at an external programming terminal of an example controller in accordance with teachings of the present invention.
Figure 5B:
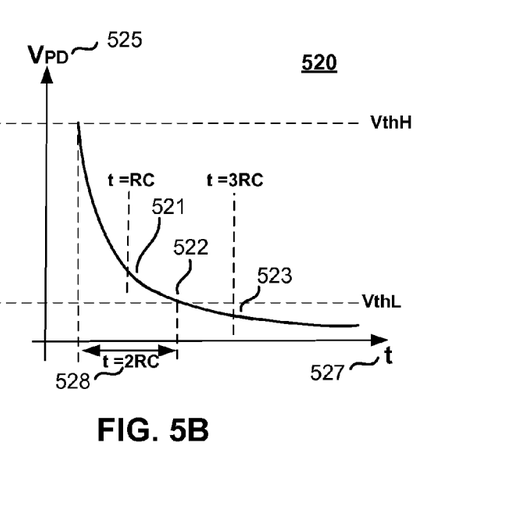
FIG. 5B shows a timing diagram that illustrates an example fall time of a voltage at an external programming terminal of an example controller in accordance with teachings of the present invention.
Figure 5C:
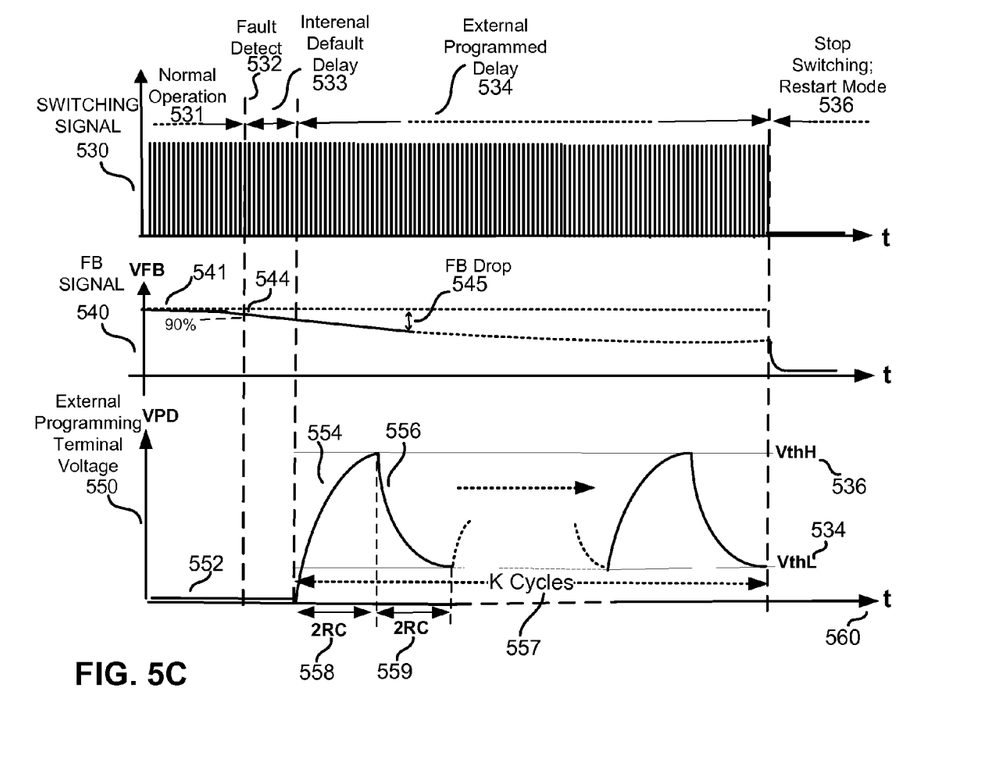
FIG. 5C shows a timing diagram that illustrates an example of an externally programmed delay in example power converter controller during a fault condition in accordance with teachings of the present invention.

FIGS. 5A-5C show examples of timing diagrams for employing the extended time delay such as for example a shutdown delay, at the event of the open loop fault detection and in the auto-restart mode, through the external user programmable circuit components in accordance with the teachings of the present invention. It is noted that in some implementations, only a fixed minimum delay is enough to be applied, which in one example is around 35 ms. In another example, an extended shutdown delay, such as an extended switching interval in auto-restart mode, can be applied by the user through the external programming components. In one example the user programmed time delay is through counting a programmed number of time periods. As an example, each time period is defined by intervals of charge/discharge period of an external programming circuit having an RC time constant according to a resistance-capacitance ($R_{PD}C_{PD}$) that enables the user to program the desired delay according to the application, such as for example the shutdown delay in auto-restart mode in accordance with the teachings of the present invention.

With respect to the example shown in FIG. 5A, diagram 510 shows an example of the charging of the external programming circuit. In the example shown in FIG. 5B, diagram 520 shows the discharging of the external programming circuit. In the examples shown in FIGS. 5A and 5B, the capacitor voltage is illustrated being charged and discharged between the low threshold VthL 514 and high threshold VthH 516 with respect to time, t 517 or 527. As shown in the examples, the charge/discharge characteristic of a capacitance C through a resistance R has the nature of a nonlinear exponential with a time constant in general represented by RC:

$$v_{ch}(t) = V_{supply}(1 - e^{-t/RC});  \quad\quad \text{Charging:}$$

$$v_{disch}(t) = v_{thH} e^{-t/RC} \quad\quad \text{Discharging:}$$

where "e=2.718281828" represents the natural (Neperian) number, that means after time t=RC capacitor voltage has raised to 63% of the final charge (100% charge: $v_{thH}-v_{thL}$) or has dropped to 37% of the final discharged level (100% discharge: $v_{thH}-v_{thL}$).

However, referring to the charging illustrated in FIG. 5A and the discharging illustrated in FIG. 5B, the charging/discharging time interval of $R_{PD}C_{PD}$ (511 on FIG. 5A and 521 on FIG. 5B) is subject to a rather high slope change. As a consequence, any small time deviation results in a high change of voltage, which can reduce the accuracy of the small time small time deviation results in a high change of voltage, which can reduce the accuracy of the measurements. On the other hand, the charging/discharging time interval of $3R_{PD}C_{PD}$ (513 on FIGS. 5A and 523 on FIG. 5B) is subject to a very slow slope change, where any small deviation in measuring the voltage may result in a high error in the time measurement. Thus, in one example, a time interval of $2R_{PD}C_{PD}$ for charging or discharging (512 on FIGS. 5A and 522 on FIG. 5B) is selected and results in a total charging plus discharging interval to be $4R_{PD}C_{PD}$.

It is appreciated that charging time is a factor of the current source used for charging while the discharge time only depends on the natural discharge between the external resistance $R_{PD}$ and external capacitance $C_{PD}$, which are defined for the user programming. Considering this fact, the other option for measurement of each time unit of charge/discharge as an example for some other applications would be charging the capacitance $C_{PD}$ through a much higher current source that makes a high slope linear charging in a very short time negligible compare to the natural discharge time. In the latter method the time measurement only depends on the external user defined components.

FIG. 5C shows one example of the timing diagram of the switching signals 530; feedback signal VFB 540 and external programming terminal voltage, which is labeled VPD voltage 550, during the open loop fault detection and the extended shutdown delay. During normal operation of the switching signals 531, the feedback signal 540 is at the regulated level 541 and external programming terminal voltage is substantially at zero 552.

In one example, the controller detects the open loop fault condition by the feedback signal 540 dropping below some threshold, which in one example is 90% of the regulated feedback 544 for a given time period, such as for example 35 ms. It is appreciated that in different applications the existence of open loop or other fault conditions could also be detected by different signals.

In an example of an open loop fault detection 532, the controller should stop switching and go into an auto-restart mode. However, in order to avoid a false fault detection and a corresponding false shutdown, the fault condition is verified if it remains valid for a long enough duration of time. This is assured by first applying a fixed internal default delay 533, which in one example is 35 ms, after the initial detection of the feedback signal 540 drop. Then, if the user optional external capacitance $C_{PD}$ is included in the external programming circuit, in parallel with the current limit programming resistance $R_{PD}$, the shutdown delay in auto-restart mode would be extended by the predetermined number K of charging/discharging cycles 557; the $2R_{PD}C_{PD}$ 558 charging interval for the charging voltage rise 554 from the low threshold voltage VthL 534 to the high threshold voltage VthH 536 and for the $2R_{PD}C_{PD}$ 559 discharging interval for the discharging voltage drop 556 from the high threshold voltage VthH 536 to the low threshold voltage VthL 534.

If in auto-restart mode, before the extended shutdown delay ends, the fault condition is removed then the switching would resume in normal operation. However, if after this extended time delay the fault condition still remains, the switching stops and controller continues in the auto-restart mode with the programmed extended auto-restart on-time. Thus, in one example when fault condition has been detected, the controller is coupled to cause repeated cycles of an auto restart mode. Switching of the power switch stops for a shutdown off-interval in response to the controller receiving a shutdown signal and then switching of the power switch restarts and continues for a restart on-interval during the fault condition. To illustrate, in one example when a fault has been detected, in the first auto-restart event, the controller stops switching for 150 ms. Then, the controller starts switching to verify if the fault condition has been removed. If the fault condition is still present, the auto-restart events repeat. In one example where there are subsequent auto-restart events with the extended shutdown delay, each duration of the stopped switching in one example would be increased up to 1.5 s.

Figure 6:
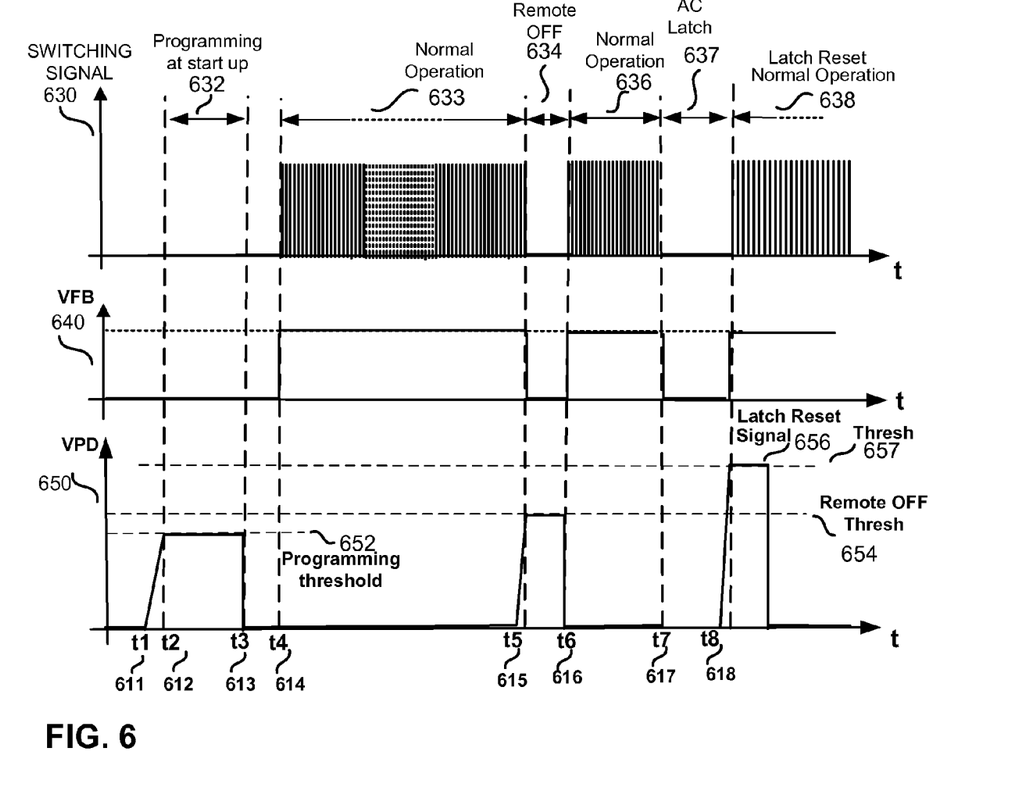
FIG. 6 shows a timing diagram that illustrates the programming some programmable characteristics during a startup of an example power converter controller in accordance with teachings of the present invention.

FIG. 6 shows a timing diagram that illustrates the programming of some programmable characteristics during a startup of an example power converter controller in accordance with teachings of the present invention. In particular, FIG. 6 shows example timing diagrams of switching signals 630, the signals on feedback pin VFB 640 and the external programming terminal voltage VPD 650 during initialization and programming at startup, during normal operation, and at the events of remote OFF or latch reset activation in accordance with the teachings of the present invention.

At startup before switching starts, which occurs before time t4 614, there is no VFB 640 signal can be received from the secondary output or from the third winding, the supply for controller can be provided for example by an external starting supply or in the case of an integrated controller with the high voltage power switch the starting supply can be through a linear internal regulator from the drain of the power switch as known to someone skilled in the art as the tab regulator. When the startup programming configuration as explained above with respect to FIG. 4A is activated at t1 611, the voltage VPD 650 on the external programming terminal rises to the programming threshold 652. For the duration of programming at startup 632 (t2 612 to t3 613), the programming for the current limit levels and for the switching frequency based on the user inserted external resistor $R_{PD}$ 484 in the external programming circuit coupled to the external programming terminal 480 and the internal look up matrix/table. After programming is completed at t3 613, switching starts at t4 614, and the normal operation 633 starts and the feedback signal VFB 640 rises to the regulation level.

FIG. 6 also illustrates an event of remote OFF 634 by externally applying a voltage greater or equal to the remote OFF threshold 654 to the external programming terminal 480 at time t5 615, which stops the switching signal 630 and results in the feedback signal VFB 640 dropping. As soon as the remote OFF signal 634 is removed at t6 616, the switching signal 630 resumes and normal operation 636 resumes.

In another example, after a period of ac latch 637, switching stops (t7 617 to t8 618) and the latch reset signal 656 is activated by externally applying a voltage greater or equal to the latch reset threshold 657, which in one example is 3.4 V, to the external programming terminal 480 at time t8 618, which results in resetting the latch to start normal switching 638.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller for use in a power converter, comprising:
    a control circuit coupled to receive a feedback signal representative of an output of the power converter, the control circuit coupled to control a switching of a power switch of the power converter in response to the feedback signal to control a transfer of energy from an input of the power converter to the output of the power converter;
    an internal programming interface circuit coupled to the control circuit;
    a coupling switcher coupled to the internal programming interface circuit;
    an external programming terminal selectively coupled to the internal programming interface circuit through the coupling switcher, wherein an external programming circuit coupled to the external programming terminal is coupled to the internal programming interface circuit through the coupling switcher during a startup programming condition and during a fault condition of the power converter, wherein the external programming circuit coupled to the external programming terminal is decoupled from the internal programming interface circuit by the coupling switcher during a normal operating condition of the power converter.

2. The controller of claim 1 wherein substantially no power is consumed through the external programming terminal when the external programming circuit coupled to the external programming terminal is decoupled from the internal programming interface circuit by the coupling switcher.

3. The controller of claim 1 wherein the internal programming interface circuit includes a decoder coupled to the control circuit to select a programmable characteristic of the controller in response to a programming current through the external programming terminal during the startup programming condition of the power converter.

4. The controller of claim 3 wherein the decoder comprises a variable current source coupled to generate a decoder current representative of the programming current through the external programming terminal during the startup programming condition of the power converter, wherein the control circuit selects the programmable characteristic of the controller in response to the decoder current.

5. The controller of claim 4 wherein the decoder current is responsive to a programming impedance included in the external programming circuit coupled to the external programming terminal.

6. The controller of claim 4 wherein the variable current source comprises a plurality of switched current sources to generate the decoder current representative of the programming current through the external programming terminal during the startup programming condition of the power converter.

7. The controller of claim 3 wherein the programmable characteristic of the controller includes a current limit characteristic of the controller.

8. The controller of claim 3 wherein the programmable characteristic of the controller includes switching frequency characteristic of the power converter.

9. The controller of claim 3 wherein the coupling switcher comprises a startup switch coupled to be activated to provide the programming current during the startup programming condition of the power converter.

10. The controller of claim 3 wherein the coupling switcher comprises a programming comparator coupled to a programming threshold to regulate the programming current through the external programming terminal in response to the programming threshold during the startup programming condition of the power converter.

11. The controller of claim 1 wherein the internal programming interface circuit includes a timing circuit coupled to the external programming terminal through the coupling switcher during the fault condition of the power converter.

12. The controller of claim 11 wherein the timing circuit is coupled to provide a programmable delay time of an extended shutdown delay during an open loop fault detection condition of the power converter.

13. The controller of claim 11 wherein the controller is coupled to cause repeated cycles of an auto restart mode in response to a detection of the fault condition, wherein switching of the power switch stops for a shutdown off-interval in response to the controller receiving of a shutdown signal and restarts and continues for a restart on-interval during the fault condition.

14. The controller of claim 11 wherein the timing circuit is coupled to provide a programmable delay time of a switch on-interval extension in each cycle of an auto restart mode of the power converter.

15. The controller of claim 11 wherein the coupling switcher comprises a fault switch coupled to be activated to couple the timing circuit to the external programming terminal during the fault condition of the power converter.

16. The controller of claim 11 wherein the timing circuit is coupled to provide a programmable delay in response to an RC time constant of the external programming circuit coupled to the external programming terminal.

17. The controller of claim 16 wherein the timing circuit comprises a set-reset latch coupled to activate and deactivate an application of a charging current to the external programming circuit through the external programming terminal to provide the programmable delay during the fault condition of the power converter.

18. The controller of claim 17 wherein the timing circuit further comprises a first comparator coupled to a lower threshold and the external programming terminal, wherein the first comparator is coupled to cause the set-reset latch to activate the application of the charging current to the external programming circuit through the external programming terminal in response a voltage at the external programming terminal being substantially equal to the lower threshold.

19. The controller of claim 18 wherein the timing circuit further comprises a second comparator coupled to an upper threshold and the external programming terminal, wherein the second comparator is coupled to cause the set-reset latch to deactivate the application of the charging current to the external programming circuit through the external programming terminal in response to a voltage at the external programming terminal being substantially equal to the upper threshold.

20. The controller of claim 17 wherein the timing circuit is coupled to provide the programmable delay in response to a predetermined number of cycles of activations and deactivations of the application of the charging current to the external programming circuit through the external programming terminal.

21. The controller of claim 20 wherein the timing circuit further comprises a counter coupled to count the predetermined number of cycles of activations and deactivations to provide the programmable delay.

22. The controller of claim 1 further comprising a remote off comparator coupled to a remote off threshold and the external programming terminal, wherein the remote off comparator is coupled to activate a remote off function of the controller in response to a voltage at the external programming terminal being substantially equal to the remote off threshold.

23. The controller of claim 1 further comprising a latch reset comparator coupled to latch reset threshold and the external programming terminal, wherein the latch reset comparator is coupled to activate a latch reset operation of the controller in response to a voltage at the external programming terminal being substantially equal to the latch reset threshold.

24. A method of controlling a power converter, comprising:
activating a programming current through an external programming terminal of a power converter controller coupled to an external programming circuit during a startup programming condition of the power converter controller;
selecting a programmable characteristic of the power converter controller in response to the programming current through the external programming terminal of the power converter controller, wherein the programmable characteristic of the power converter controller is selected in response to programming resistance included in the programming circuit;
deactivating the programming current through the external programming terminal after the startup programming condition of the power converter controller such that substantially no power is consumed through external programming terminal during a normal operating condition of the power converter; and
activating and deactivating an application of a charging current through the external programming terminal of the power converter controller and through the external programming circuit during a fault condition of the power converter controller, wherein a delay time provided by the activating and deactivating of the application of the charging current is responsive to an RC time constant of the programming circuit.

25. The method of claim 24 wherein selecting the programmable characteristic of the power converter controller comprises selecting a current limit characteristic of the power converter controller.

26. The method of claim 24 wherein selecting the programmable characteristic of the power converter controller comprises selecting a switching frequency characteristic of the power converter controller.

27. The method of claim 24 further comprising counting a predetermined number of cycles of activations and deactivations of the application of the charging current through the external programming terminal of the power converter controller and through the external programming circuit to provide an extended shutdown delay during an open loop fault detection condition of the power converter.

28. The method of claim 24 further comprising counting a predetermined number of cycles of activations and deactivations of the application of the charging current through the external programming terminal of the power converter controller and through the external programming circuit to provide an on-time extension in each cycle of an auto restart mode of the power converter.

29. The method of claim 24 wherein selecting the programmable characteristic of the power converter controller in response to the programming current through the external programming terminal of the power converter controller comprises regulating the programming current until a voltage at the external programming terminal of the power converter controller reaches a programming threshold.

30. The method of claim 24 further comprising activating a remote off function of the power converter controller in response to a voltage at the external programming terminal of the power converter controller reaching a remote off threshold.

31. The method of claim 24 further comprising activating a latch reset operation of the power converter controller in response to a voltage at the external programming terminal reaching an ac reset threshold.

* * * * *